United States Patent
Seo et al.

(10) Patent No.: US 7,372,912 B2
(45) Date of Patent: May 13, 2008

(54) METHOD AND APPARATUS FOR ALLOCATING CHANNELIZATION CODES FOR WIRELESS COMMUNICATIONS

(75) Inventors: Dong-Youn Seo, Seoul (KR); Bong-Hoe Kim, Gyeonggi-Do (KR); Dong-Hee Shim, Seoul (KR); Hyounhee Koo, Gwangju (KR)

(73) Assignee: LG Electronics Inc., Seoul (KR)

( * ) Notice: Subject to any disclaimer, the term of this patent is extended or adjusted under 35 U.S.C. 154(b) by 656 days.

(21) Appl. No.: 10/845,530

(22) Filed: May 14, 2004

(65) Prior Publication Data

US 2005/0002467 A1 Jan. 6, 2005

(30) Foreign Application Priority Data

May 15, 2003 (KR) .................. 10-2003-0031013
May 15, 2005 (KR) .................. 10-2003-0030988

(51) Int. Cl.
*H04B 7/02* (2006.01)
(52) U.S. Cl. .................. 375/267; 375/260; 455/132; 455/522; 455/130
(58) Field of Classification Search ............... 375/267, 375/299, 347; 455/101
See application file for complete search history.

(56) References Cited

U.S. PATENT DOCUMENTS

| 6,662,024 | B2 * | 12/2003 | Walton et al. | ........... 455/562.1 |
|---|---|---|---|---|
| 6,741,587 | B2 * | 5/2004 | Holma et al. | ................ 370/362 |
| 6,785,250 | B2 * | 8/2004 | Vayanos et al. | ............. 370/335 |
| 2001/0053143 | A1 | 12/2001 | Ye et al. | ...................... 370/477 |
| 2002/0136327 | A1 | 9/2002 | Hesham et al. | ............. 375/308 |
| 2003/0013468 | A1 | 1/2003 | Khatri | ........................ 455/501 |

* cited by examiner

*Primary Examiner*—Shuwang Liu
*Assistant Examiner*—Dhaval V Patel
(74) *Attorney, Agent, or Firm*—Ked & Associates, LLP

(57) ABSTRACT

A data transmission method for a MIMO (Multiple-input Multiple-Output) system allowing multiple terminals to share channelization codes according to the channel states, by receiving channel information from terminals, allocating channelization codes for each transmit antenna based upon the received channel information, and transmitting data via each transmit antenna according to the allocated channelization codes. When there are many user terminals and if the number of channelization codes are limited, namely, when the total number of channel codes used to distinguish the terminals is less than the total number of terminals, channelization code sharing per transmit antenna among multiple terminals is performed, such that the throughput of data that can be sent by using each channelization code is increased.

15 Claims, 8 Drawing Sheets

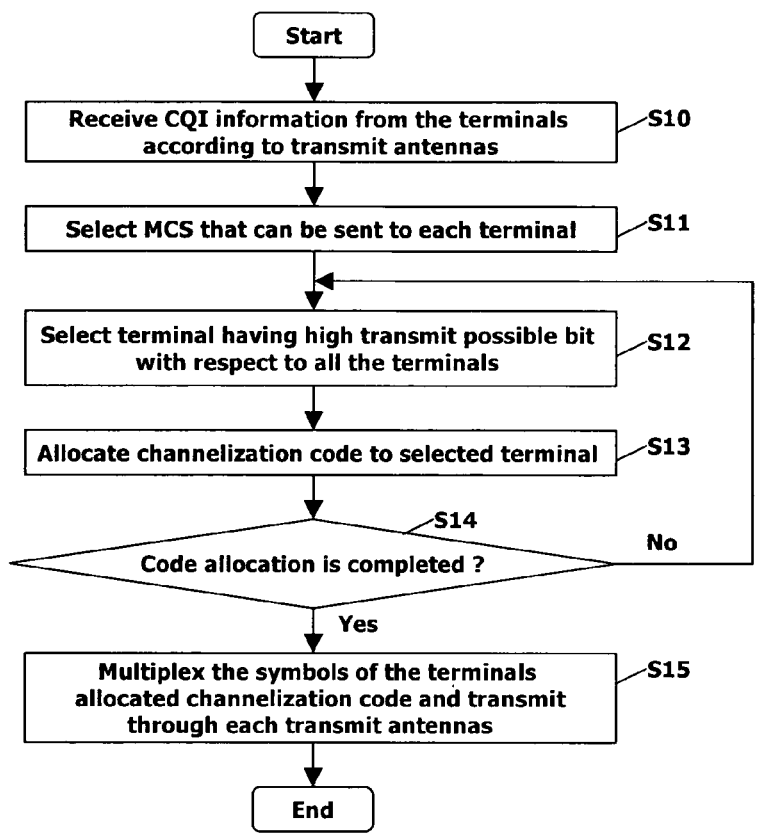

FIG.6

|     | UE1   | UE2    | UE3    | UE4 | UE5   | UE6   | UE7   | UE8   |
|-----|-------|--------|--------|-----|-------|-------|-------|-------|
| Tx 1 | 4 (C1) | 0 | 2 | 1 | 0 | 4 (C2) | 4 (C3) | 4 (C4) |
| Tx 2 | 4 (C1) | 0 | 4 (C2) | 2 | 4 (C3) | 0 | 1 | 2 (C4) |
| Tx 3 | 4 (C1) | 0 | 4 (C2) | 2 | 0 | 4 (C3) | 0 | 2 (C4) |
| Tx 4 | 4 (C1) | 4 (C2)) | 2 (C4) | 0 | 1 | 0 | 4 (C3) | 2 |

Total    16 bps/Hz  4 bps/Hz  12 bps/Hz  5 bps/Hz  5 bps/Hz  8 bps/Hz  9 bps/Hz  11 bps/Hz $$\left. \begin{array}{l} C1 : 16 \text{ bps/Hz} \\ C1 : 16 \text{ bps/Hz} \\ C1 : 16 \text{ bps/Hz} \\ C1 : 10 \text{ bps/Hz} \end{array} \right\} = 58 \text{ bps/Hz}$$

FIG.8
Related Art

|  | UE1 | UE2 | UE3 | UE4 | UE5 | UE6 | UE7 | UE8 |
|---|---|---|---|---|---|---|---|---|
| Stream 1 | 4(C1) | 3 | 4(C2) | 2 | 4 | 4 | 3(C3) | 3(C4) |
| Stream 2 | 3(C1) | 0 | 2(C2) | 2 | 1 | 2 | 3(C3) | 2(C4) |
| Stream 3 | 2(C1) | 0 | 2(C2) | 1 | 0 | 0 | 1(C3) | 1(C4) |
| Stream 4 | 1(C1) | 0 | 1(C2) | 0 | 0 | 0 | 0(C3) | 1(C4) |

Total   10 bps/Hz  3 bps/Hz  9 bps/Hz  5 bps/Hz  5 bps/Hz  6 bps/Hz  7 bps/Hz  7 bps/Hz $\left.\begin{array}{l} C1: 10 \text{ bps/Hz} \\ C2: 9 \text{ bps/Hz} \\ C3: 7 \text{ bps/Hz} \\ C4: 7 \text{ bps/Hz} \end{array}\right\} = 33 \text{ bps/Hz}$

FIG.10

| | UE1 | UE2 | UE3 | UE4 | UE5 | UE6 | UE7 | UE8 |
|---|---|---|---|---|---|---|---|---|
| Stream 1 | $w_{1'}^1$ 4(C1) | 3(C3) | 4(C2) | 2(C1) | 4(C3) | 4(C4) | 3(C3) | 3(C4) |
| Stream 2 | $w_{2'}^1$ 4(C1) | 0 | 2(C2) | 2(C2) | 1 | 2(C4) | 3(C3) | 2(C4) |
| Stream 3 | $w_{3'}^1$ 3(C1) | 0 | 2(C2) | 1 | 0 | 0 | 1(C3) | 1(C4) |
| Stream 4 | 1(C1) | 0 | 1(C2) | 0 | 0 | 0 | 0(C3) | 1(C4) |

Total    12 bps/Hz  3 bps/Hz  9 bps/Hz  5 bps/Hz  5 bps/Hz  6 bps/Hz  7 bps/Hz  7 bps/Hz $\left.\begin{array}{l} \text{C1 : 13 bps/Hz} \\ \text{C2 : 10 bps/Hz} \\ \text{C3 : 13 bps/Hz} \\ \text{C4 : 11 bps/Hz} \end{array}\right\} = 47 \text{ bps/Hz}$

METHOD AND APPARATUS FOR ALLOCATING CHANNELIZATION CODES FOR WIRELESS COMMUNICATIONS

BACKGROUND OF THE INVENTION

1. Field of the Invention

The invention relates to communication systems, more particularly, to methods and apparatus for allocating channelization codes in a wireless communication system with multiple antennas.

2. Description of the Background Art

Due to the rapid development of wireless communications, there is an increasing need to provide various types of multimedia services (e.g., video, photos, animation, music, games, etc.) through wireless interfaces supporting higher capacity data transmissions and higher data transmission rates. Accordingly, methods for allowing more efficient use of limited bandwidth are becoming more critical. To address these issues, new data transmission techniques using multiple antennas are being developed, and the so-called "MIMO" (Multiple-input Multiple-Output) technique is one such example.

FIGS. 1 and 2 show the structures of a transmit end and a receive end for a PARC (Per Antenna Rate Control) MIMO system.

As shown in FIG. 1, the transmit end of a MIMO system comprises a demultiplexer (Demux) 10 that separates (branches) an inputted high speed data stream to multiple transmit antennas (Ant 1~Ant n), a symbol coding unit 11 that generates symbols by coding each sub-stream separated from the inputted data stream, a channelization coding unit 12 that allocates channelization codes (C1-Cn) to the symbols outputted from the symbol coding unit 11, an adder 13 that adds the symbols coded by the channelization coding unit 12, a scrambling unit 14 that allocates scrambling codes (S1~Sn) to the symbols outputted from the adder 13, and multiple transmit antennas (Tx1~Txn) that transmit the symbols that have been spread by the scrambling unit 14. Note that the scrambling codes S1~Sn are usually the same code.

The symbol coding unit 11 performs channel coding, interleaving, and mapping operations to generate symbols, and also performs the function of separating the generated symbols. The channelization coding unit 12 allocates channelization codes (C1~Cn) to the separated symbols and spread the symbols, and the scrambling unit 14 scrambles the symbols spread by channelization codes allocated thereto.

In the related art, the receive end of the MIMO system as shown in FIG. 2 comprises an interference signal removal unit 20 that removes interference signals from a received signal, a MMSE detector 21 that performs MMSE (Minimum Mean-squared Error) linear conversion upon finding the signal having the largest SINR (Signal-to-Interference Noise Ratio) among those signals outputted from the interference signal removal unit 20, a de-spreading unit 22 that de-spreads the output of the MMSE detector 21, a multiplexer (MUX) 23 that multiplexes the de-spread signals, a symbol detecting unit 24 that processes the multiplexed signal and detects a sub-stream therefrom, a signal reconstruct unit 25 that reconstructs the sub-stream detected by the symbol detecting unit 24 into a format that is equivalent (or similar) to the received signal, and a signal collecting unit 26 that forms a data stream by collecting the sub-streams that were sequentially detected by the symbol detecting unit 24.

The interference signal canceling unit 20 comprises a plurality of buffers used for deleting the sub-streams reconstructed at the symbol detecting unit 24 from the received signal. The de-spreading unit 22 comprises a plurality of de-spreaders to perform de-spreading by using the codes allocated to a corresponding sub-stream at the transmit end.

The related art MIMO system having the above structure performs the following operations.

The high speed data stream is demultiplexed by the demultiplexer 10 into a number of sub-streams equaling the total number of transmit antennas. Each demultiplexed sub bit stream undergoes channelization coding and interleaving at the symbol coding unit 11 and then is mapped to symbols. The corresponding symbols are again separated/branched (demultiplexed) according to the total number of channelization codes.

The channelization coding unit 12 allocates channelization codes (C1-Cn) to the branched symbols, and the symbols having channelization codes allocated thereto are added into one symbols at the adding unit 13. The scrambling unit 14 allocates scrambling codes to the symbols outputted from the adding unit 13 and then transmits via the transmit antennas (Tx1-Txn). Generally, the scrambling codes allocated to the symbols are the same code.

The MMSE detector 21 of the receiving end detects a signal having the largest SINR (Signal-to-Interference Noise Ratio) among the signals received via the receive antennas (Rx1-Rxn) and performs MMSE (Minimum Mean-squared Error) linear conversion. The output of the MMSE detector 21 is de-spread at the de-spreading unit 22 and is combined into one signal at the multiplexer 23. The symbol detecting unit 24 detects the transmit symbols from the signals output by the multiplexer 23, and then performs reverse mapping and reverse interleaving operations for detection as a first stream.

The signal reconstruct unit 25 reconstructs the first sub-stream detected by the symbol detecting unit 24 into the form of the receive signal and then outputs to the interference signal canceling unit 20, which removes the reconstructed signal from the receive signal stored in the buffer and then outputs to the MMSE detector 21.

Accordingly, the MMSE detector 21 performs MMSE (Minimum Mean-squared Error) liner conversion on the signal having the largest SINR (Signal-to-Interference Ratio) among the remaining signals, and the output of the MMSE detector 21 goes through the de-spreading unit 22 and the multiplexer 23, and is inputted to the symbol detecting unit 24, which detects a second sub-stream.

The signal reconstruct unit 25 reconfigures the second sub-stream detected by the stream detecting unit 24 and outputs to the interference signal canceling unit 20, which removes the reconstructed signal from the signal stored in the buffer and outputs to the MMSE detector 20. Then, the above explained procedures are repeatedly performed such that the symbol detecting unit 24 sequentially detects sub-streams.

Thus, when all sub-streams are detected by the symbol detecting unit 24, the detected multiple sub-streams are collected by the signal collecting unit 26 to form a single data stream.

Hereafter, the method of allocating channelization codes to the transmit symbols at the transmit end will be explained in more detail as follows.

FIG. 3 is a flow chart showing a channelization allocation method in a mobile communications system according to the related art.

In general, when transmitted certain data to multiple terminals (e.g., user equipment) (UE1~UE8), a pilot signal is first transmitted for initial synchronization with each terminal. The terminals (UE1~UE8) that receive the pilot signal refer to the state of each transmit antenna and of each receive link, and transmit channel quality information (CQI) to the base station. Here, the CQI can be, for example, a 'transmit possible bit number', i.e., the number of bits (bps/Hz) that may be transmitted by each terminal for each transmit antenna.

The base station receiving CQI information from the terminals according to the transmit antennas, selects from the CQI information, a MCS (Modulation Code Set) that can be sent to each terminal in order to support a high data transmission rate (S10, S11). Then, the base station selects a terminal having a high 'transmit possible bit number' with respect to all the antennas, and allocates channelization codes to the selected terminal (S12). Namely, channelization codes are sequentially allocated to the symbols to be transmitted to the selected terminal (S13).

FIG. 4 shows an example of allocating channelization codes when there are 4 transmit antennas, 8 users, and 4 channelization codes.

As shown in FIG. 4, because it is assumed that the maximum 'transmit possible bit number' is largest for UE1 and smallest for UE 2, namely, the order according to 'transmit possible bit number' size is UE1>UE3>UE8>UE7>UE6>UE4(=UE5)>UE2, the base station sequentially allocates C1, C2, C3, and C4 respectively to each of the symbols of UE1, UE3, UE5, and UE6 to be transmitted via the four transmit antennas (Tx1~Tx4), while channelization codes are not allocated to the remaining terminals (UE2, UE4, UE5, and UE6).

When allocation of channelization codes is completed, the base station multiplexes the symbols of the terminals having channelization codes allocated thereto and transmits through each transmit antenna (Tx1~Tx4) (S14, S15).

In general, for a MIMO system using multiple antennas at the transmit and receive ends, the channel quality for each transmit antenna is different. Thus, even if the link quality between the base station and the terminals is considered to be good, in actuality, certain links may be considered extremely good while other links may be considered extremely bad. In such situations, link adaptation procedures, such as AMC (Adaptive Modulation and Coding) are used to apply higher modulation methods (such as QAM (Quadrature Amplitude Modulation)) in order to maximize system throughput.

When many users simultaneously receive services in a MIMO system, the base station uses channelization codes to distinguish each user. However, if the total number of channelization codes is less than the total number of users, and the related art channelization code allocation method is employed, there are situations where limited channel resources cannot be efficiently used. Namely, as shown in FIG. 4, when there are eight users and four channelization codes are used, certain terminals (i.e., UE2, UE4, UE5, and UE6) are not allocated with any channelization codes, and thus the efficiency of using channel resources is undesirably decreased. This is because the related art channelization code allocation method performs allocation of channelization codes by determining the maximum 'transmit possible bit number' (i.e., the channel state or condition) for each antenna.

Additionally, if the quality of the links between the base station and the terminals are all considered to be bad (namely, when some links between the transmit/receive antennas are good, while other links are bad), a low MCS (Modulation and Coding Set) is used or data streams are not even transmitted for those channels allocated to the bad links according to the related art. Thus, efficiency of channel usage is degraded, and in particular, the data stream detection performance at the receive end is degraded.

The present invention also relates to transmitting signals in a MIMO (Multiple-Input Multiple-Output) radio communication system to allow more efficient use of resources.

Transmission methods employing antenna signal processing techniques can be classified into open-loop procedures and closed-loop procedures. The open-loop procedure is a method that can implement code re-using techniques together with antenna diversity techniques, whereby a mobile station need not provide feedback of channel information to the base station. The closed-loop procedure employs weight information (W), used for the multiple antennas, obtained by using channel information that is measured at and fed back from the receiving end, and corresponding weight values are applied to each antenna for signals to be transmitted.

The MSB (Multi-Stream Beam-forming) or PSRC (Per-Stream Rate Control) MIMO system is one kind of FDD (Frequency Division Duplex) type closed-loop MIMO system.

FIG. 7 depicts a MSB MIMO system configuration according to the related art. The transmitting end 710 comprises a demultiplexing unit 711 that receives source data bits, a modulation unit 713 that performs modulation allocation to each symbol sent from the demultiplexing unit 711 and that receives feedback from the receiving end (explained hereafter), a weight vector multiplying unit 715 that multiplies a weight vector to each modulation allocated symbol sent from the modulation unit 713 and that receives feedback from the receiving end (explained hereafter), and a plurality of transmit antennas (Tx 1 through Tx M) that allows signal transmission through a MIMO channel.

The transmitting end considers the magnitude of each eigenvalue through the Eigen-decomposition of the channel matrix that is estimated by the receiving end. For those channel regions having relatively large eigenvalues, high order modulation methods (such as 64 QAM, 16 QAM, and the like) are applied, while for those channel regions having relatively small eigenvalues, low order modulation methods (such as, BPSK, QPSK, and the like) are applied. In order to maintain the independence of the symbols that are transmitted through respectively different data streams, eigenvectors of the channel matrix are respectively multiplied to the symbols, which are then transmitted.

Namely, the same modulation method is not used for all the symbols transmitted by each transmission stream, but the channel conditions (i.e., state or status) of the transmission end are received as feedback from the terminals, and the appropriate modulation method for each stream is used according to the channel conditions. Here, it can be understood that the receiving end requires the same algorithm as that used in the transmitting end in order to determine the modulation method used for each antenna for reception.

Also, for the symbols transmitted in a respectively different manner via each stream, the eigenvectors obtained by Eigen-decomposition of the channel matrix are respectively multiplied to the symbols and then transmitted, which allows channel region correlation to be utilized to the maximum, and independence among transmission streams is maintained.

For relatively small channel regions with eigenvalues (obtained by Eigen-decomposition of the channel matrix) of less than a particular value, symbols are not even transmitted in order to prevent the possibility of errors being generated at the receiving end for the symbols transmitted from the transmitting end.

Even so, because the symbols are allocated such that higher order modulation is used for streams having good channel conditions, the total number of bits to be transmitted via all the transmit antennas is increased, thus aiding the increase of throughput. Accordingly, the overall communication quality can be improved by having the transmitting end prevent (in advance) the transmission of symbols in the channel region created by using eigenvectors with small eigenvalues, whereby symbol transmission would be useless anyway.

As shown in FIG. 7, the MSB MIMO system has an M number of transmit antennas and an N number of receive antennas. If $\underline{H}$ refers to the channel matrix that the signal vectors (respectively transmitted differently via the M transmit antennas) go through prior to being received at the receiving end, the receiving end estimates the channel matrix ($\underline{H}$), and then sends to the transmitting end by feedback, each eigenvalue and eigenvector value obtained by Eigen-decomposition performed at the receiving end. Alternatively, the eigenvalues can be compared and if the transmitting and receiving ends have a pre-defined modulation method allocation table, an index value (also stored in the table) corresponding to the modulation method to be used for each stream may be fed back to the transmitting end.

As shown in FIG. 7, the receiving end 720 comprises a plurality of receive antennas (Rx 1 through Rx N) that receives signals from the transmitting end 710 via a MIMO channel, a detecting unit 721 that processes the received signal by using zero-forcing or MMSE methods, a conjugate multiplying unit 723 that multiplies conjugate values (of the weight vectors multiplied at the transmitting end 710) to the symbols outputted from the detecting unit 721, a demodulation unit 725 that performs demodulation by using the modulation allocated to the symbols, and a multiplexing unit 727 that performs multiplexing to output reception data. Furthermore, there is a channel estimator 722 that also receives the signals from the receive antennas (Rx 1 through Rx N) and an Eigen-decomposition unit 724 that processes the output of the channel estimator 722, and the results are fed back to the transmitting end 710. Here, the eigenvector information can be fed back to the weight vector multiplying unit 715, while the eigenvalue information can be fed back to the modulation unit 713.

The receiving end estimates (deduces) the signal vectors that are generated at the transmitting end by performing beam-forming on each symbol, by employing the generally well-known zero-forcing techniques or MMSE techniques. Then, conjugate values of the weight vectors (that were multiplied to each symbol at the transmitting end) are multiplied to the signal vectors to obtain (detect) each symbol. Thereafter, the symbols transmitted via each transmit antenna are modulated according to the corresponding modulation method, to thus determine the bits that were transmitted from the transmitting end, and multiplexing is performed to re-configure the bit streams transmitted from the transmitting end.

For the MSB MIMO system of the related art, a method for forming a beam for each symbol can be summarized by the following Equation (1):

$$S = w_1 s_1 + \ldots w_M s_M \tag{1}$$

Here, $w_i$ refers to a weight vector used in beam-forming for each symbol, $s_1$ through $s_M$ refer to data symbols, and S refers to a signal vector after beam-forming is performed for each symbol. Each of the symbols $s_1, \ldots, s_M$ is constructed from independent bit streams outputted from an M number of independent coding blocks.

The symbols transmitted from each transmit antenna are not modulated using the same modulation method, but the channel condition (state) information of each antenna are received as feedback from the terminals, and modulation is performed by to the modulation method determined according to each channel condition, respectively.

Thus, for the symbols $s_1$ through $s_M$ in Equation (1), the eigenvalues of the channel matrix are compared and respectively different modulations are employed. Namely, upon performing Eigen-decomposition of the channel matrix, a higher order modulation is allocated to those streams having a relatively high eigenvalue, and a lower order modulation is allocated to those streams having a relatively low eigenvalue. Here, it is assumed that an eigenvector corresponding to the largest eigenvalue is multiplied to the stream having a subscript of 1, and for the other streams thereafter, eigenvectors are multiplied sequentially thereto according to the order of magnitude of the eigenvalues.

The method for obtaining the weight vectors to be multiplied to each symbol can be summarized as follows.

If $\underline{H}$ refers to the channel matrix that the signal vectors (respectively transmitted differently via the M transmit antennas) go through prior to being received at the receiving end, and if the receiving end has N receive antennas, the channel matrix is a N*M matrix. If a pilot symbol (that is already known by the transmitting and receiving ends) or a separate pilot channel is transmitted from each antenna of the transmitting end, the receiving end can deduce each component of the channel matrix.

For the channel matrix $\underline{H}$, the receiving end performs Eigen-decomposition. In this system, because it is assumed that the number of antennas in the antenna array at the transmitting end is greater than that at the receiving end, the channel matrix $\underline{H}$ is not a square matrix, and thus Eigen-decomposition cannot be performed on the channel matrix itself, thus Eigen-decomposition of $\underline{H}^H \underline{H}$ is performed instead.

$$\underline{H}^H \underline{H} \Rightarrow \lambda_1 e_1 + \lambda_2 e_2 + \ldots + \lambda_M e_M \tag{2}$$

Here, H refers to a Hermitian calculation, $\lambda_M$ refers to the eigenvalues of the matrix $\underline{H}^H \underline{H}$, and $e_M$ refers to eigenvectors.

In general, because each eigenvector maintains orthogonal characteristics, signals can be transmitted by multiplying independent weight vectors to each symbol, when symbols are to be transmitted altogether from the transmitting end according to the number of antennas at the transmitting end.

As in Equation (1), if a signal is to be transmitted upon performing beam-forming on each symbol, the receiving end performs the following signal processing. As the signal was transmitted after multiplying independent weight vectors to each symbol, S can be deduced by using the generally known zero-forcing or MMSE methods, and then weight vectors are multiplied to each symbol at the transmitting end for transmitting the signal from the transmitting end, whereby the signal received by the receiving end can be expressed as the following Equation (3):

$$R = \underline{H}S + n \quad (3)$$

whereby, n refers to AWGN (Additive White Gaussian Noise).

If the signal vector S transmitted upon multiplying a weight vector to each symbol by using zero-forcing is deduced as being the signal vector Ŝ, this signal vector can be expressed as the following Equation (4):

$$\hat{S} = [\underline{H}^H \underline{H}]^{-1} \underline{H}^H R \quad (4)$$

If the signal vector S transmitted upon multiplying a weight vector to each symbol by using MMSE is deduced as being the signal vector Ŝ, this signal vector can be expressed as the following Equation (5):

$$\hat{S} = [\alpha \underline{I} + \underline{H}^H \underline{H}]^{-1} \underline{H}^H R \quad (5)$$

Here, α refers to the signal to interference noise ratio, and $\underline{I}$ refers to an identity matrix. If the signal vector S transmitted upon multiplying a weight vector to each symbol by using zero-forcing or MMSE methods is deduced as being the signal vector Ŝ, and the conjugate values of the weight vectors (that were multiplied to each symbol and transmitted from the transmitting end) are multiplied to the deduced signal vector so that the symbols $s_1$ through $S_M$ transmitted from the transmitting end can be deduced to obtain the deduced symbols $\hat{s}_1$ through $\hat{s}_M$, which can be expressed as the following Equations (6):

$$\hat{s}_1 = w_1^H \hat{S} \ldots \hat{s}_{M=wM}^H \hat{S} \quad (6)$$

The deduced symbols $\hat{s}_i$ through $\hat{S}_M$ are then modulated according to their respective modulation methods so that the bits prior to allocation to each symbol can be determined. Also, after the bits of the symbols transmitted via each antenna, the bit stream transmitted from the transmitting end is determined through multiplexing.

When respectively different symbols are transmitted from each transmit antenna, in addition to transmission upon multiplying eigenvectors (of the channel matrix) to each symbol, the receiving end also relatively compares the eigenvalues (of the channel matrix) obtained through Eigen-decomposition in order to consider the channel state (condition) of each antenna for determining the channel coding and modulation method for the symbols to be transmitted via each antenna.

To obtain the weight vector that is to be multiplied to the symbols to be transmitted independently from each transmit antenna, Eigen-decomposition of the deduced channel matrix must be performed at the receiving end. Here, no additional calculations are needed, because eigenvalues and eigenvectors can be obtained together through Eigen-decomposition.

Namely, the same modulation method is not applied to the symbols transmitted from each transmit antenna, but each channel region state is received as feedback from the terminals, and the appropriate modulation method to be used is determined accordingly for each stream based upon the channel state. Thus, by comparing the eigenvalues of the channel matrix for $s_1$ through $s_M$ in Equation (1), respectively different modulation methods are employed.

Thus, upon performing Eigen-decomposition of the channel matrix, a higher order modulation is allocated to those streams having a relatively high eigenvalue, and a lower order modulation is allocated to those streams having a relatively low eigenvalue.

Of course, after determining the channel coding method and modulation method of the symbols to be transmitted in each stream, there are no changes in performing independent beam-forming of each symbol by using the eigenvectors of the channel matrix obtained at the receiving end as weight vectors. Here, the method of determining the modulation and coding scheme (MCS) to be allocated to each antenna is as follows.

To determine the modulation method to be allocated to each stream using the eigenvalues obtained by the Eigen-decomposition as shown in Equation (2), the respective ratios ($\lambda_1 : \lambda_2 : \ldots : \lambda_M$) of each eigenvalue is first determined.

Through these ratios, if the smallest eigenvalue is less than a threshold value, symbols are not transmitted in the channel region created by the corresponding eigenvector. For the next smallest eigenvalue, a lower order MCS (modulation and coding set) is used, while a higher order MCS is used for the largest eigenvalue. For intermediate eigenvalues, an intermediate order MCS is used upon relative comparison of such values.

Then, after confirmation by testing different channel states (conditions) through simulations, a modulation allocation table may be used to select the desired modulation and coding combination that is appropriate for the channel state.

However, when multiple terminals receive a service in the related art MSB MIMO system, channelization codes are used to distinguish the terminals. Multiple data streams transmitted simultaneously by one terminal can be distinguished by the orthogonal characteristics of eigenvectors.

FIG. 8 depicts a table to explain the method of allocating radio resources in a related art MIMO system when multiple terminals simultaneously receive service, and the number of channelization codes are less than the number of terminals. It shows an example where there are 8 terminals, and 4 channelization codes are used. Here, only terminals 1, 3, 7, and 8 are allocated with channelization codes and can communicate, while terminals 2, 4, 5, and 6 are not allocated with channelization codes (even though there are available radio resources) and thus cannot communicate.

As shown in FIG. 8, if the number of channelization codes are less than the number of terminals in the related art MIMO system, channel resources cannot be allocated due to the lack of channelization codes, even though there are available channel resources.

Also, excluding the situation when the quality of all the channel links between the base station and multiple terminals are good, namely, when some transmit channel links are good while others are bad, the data streams allocated to the bad links are not even transmitted or are transmitted by using lower order MCS (modulation and coding schemes), thus channel resources are not efficiently utilized.

SUMMARY OF THE INVENTION

Therefore, a first object of the present invention is to provide an apparatus and method for allocating channelization codes in a mobile communication system capable of enhancing a symbol detection capability of a receiving end.

A second object of the present invention is to provide an apparatus and method for allocating channelization codes in a mobile communication system capable of improving usage efficiency of a limited channel resource.

A third object of the present invention is to provide an apparatus and method for allocating channelization codes in a mobile communication system capable of allowing users to share channelization codes by antennas.

A fourth object of the present invention is to provide an apparatus and method for allocating channelization codes in a mobile communication system capable of increasing a throughput of data that can be sent through channelization codes.

To achieve at least the above objects in whole or in parts, there is provided a transmission method for a multiple antenna communication system, the method comprises receiving channel information from terminals, allocating channelization codes for each transmit antenna based upon the received channel information, and transmitting data via each transmit antenna according to the allocated channelization codes.

To achieve at least the above objects in whole or in parts, there is provided a base station apparatus having multiple transmit antennas, the apparatus comprises a receiver that receives channel information from terminals, an allocating unit that allocates channelization codes for each transmit antenna based upon the received channel information, and a transmitter that transmits data via each transmit antenna according to the allocated channelization codes.

The inventors have recognized and addressed at least the above-explained shortcomings of the related art by developing a technique for improved symbol detection performance at the receive end of a MIMO system when allocating channelization codes in a mobile (wireless) communication system. As a result, the efficiency of using channel resources can be improved, data throughput can be increased, and channelization codes can be shared between users according to the transmit antennas.

In a broad sense, the aspects of the invention relate to allocation of channelization codes for each antenna according to the channel quality between the transmit and receive antennas. The channel quality may be determined based upon channel quality information (CQI) sent from each terminal, and the CQI can be mapped by using the 'transmit possible bit number' of each antenna for each terminal.

The channel quality information is received, channelization codes are sequentially allocated to each antenna according to the channel quality information, and data transmission is then performed.

Also, the inventors recognized and addressed the problems of the related art by developing a signal transmitting method for a MIMO system in which channelization codes are shared by multiple terminals when the number of terminals is greater than the number of channelization codes, such that radio resources are more efficiently utilized.

BREIF DESCRIPTION OF THE DRAWINGS

FIG. 3 depicts a flow chart showing a channelization code allocation method for a mobile communication system according to the related art.

FIG. 4 depicts an example for FIG. 3 of allocating channelization codes when there are four transmit antennas, eight users, and four channelization codes.

FIG. 6 depicts an example for FIG. 5 of allocating channelization codes when there are four transmit antennas, eight users, and four channelization codes.

FIG. 8 depicts a table used to explain an allocation method for radio resources when the number of channelization codes is less than the number of terminals and multiple terminals simultaneously receive a service according to the MIMO system of the related art.

FIG. 10 depicts a table used to explain an allocation method for radio resources when the number of channelization codes is less than the number of terminals and multiple terminals simultaneously receive a service in the MIMO system according to an embodiment of the present invention.

DETAILED DESCRIPTION OF THE PREFERRED EMBODIMENTS

In general, the channel quality of each transmit antenna in a MIMO system employing multiple antennas at the transmit and receive ends. Namely, even if the overall channel quality of the transmit antennas with respect to a particular terminal (user) is satisfactory, the channel quality between each antenna and various terminals may not be satisfactory. Thus, even if the link quality between the base station and the terminal is considered to be good, in actuality, there may be some links that are considered very good, while other links that are considered not good.

Accordingly, unlike the related art that considers the maximum 'transmit possible bit number' with respect to all antennas when allocating channelization codes, the invention provides a scheme that determines the maximum 'transmit possible bit number' (i.e., the channel state or condition) for each antenna when allocating channelization codes.

Also, when multiple users simultaneously receive a service in a MIMO system according to the related art, if the number of channelization codes is less than the number of users, there are situations where a user with satisfactory channel quality for a particular transmit antenna is not allocated with channelization codes, although the channel quality of the overall transmit antennas are not satisfactory.

Thus, the invention provides a scheme in which channelization codes can be shared between users according to the transmit antennas, to allow more efficient use of the limited number of channelization codes.

Figure 1:
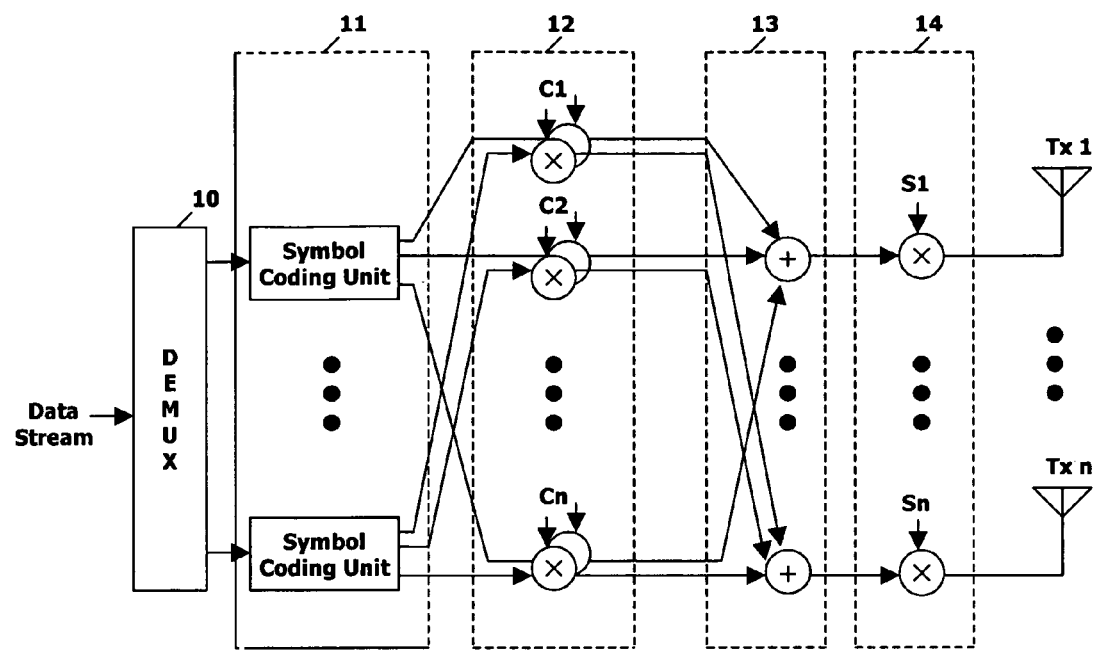
FIG. 1 depicts a transmit end of a PARC (Per Antenna Rate Control) MIMO system according to the related art.
Figure 2:
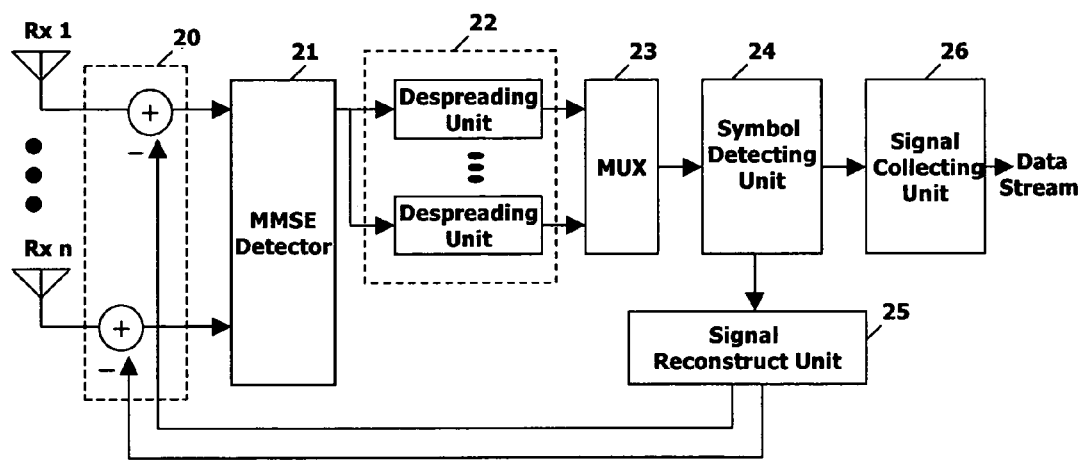
FIG. 2 depicts a receive end of a PARC (Per Antenna Rate Control) MIMO system according to the related art.
Figure 5:
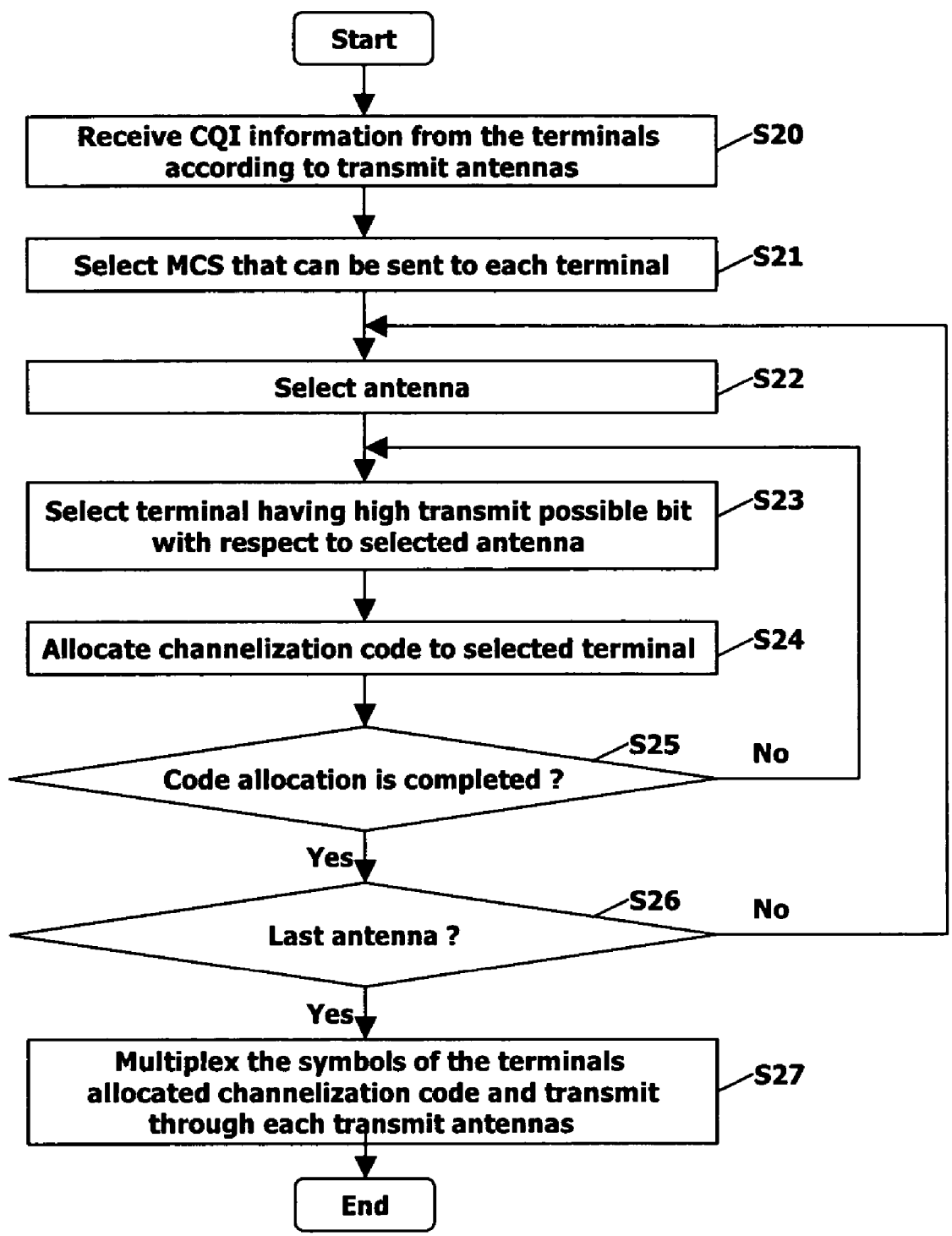
FIG. 5 depicts a flow chart showing a channelization code allocation method for a mobile communication system according to an embodiment of the present invention.

FIG. 5 depicts a flow chart showing a channelization code allocation method for a mobile communication system according to an embodiment of the present invention.

As shown in FIG. 5, when data (i.e., a data stream) is to be transmitted to multiple terminals (UE1~UE8), the base station first transmits a pilot signal for initial synchronization with the terminals.

The terminals (UE1~UE8) receiving the pilot signal determine the state (condition) of each link between the transmit antennas (array) and the receive end, and transmits to the base station CQI data indicating the link quality. Here, the CQI data can be mapped by, for example, transmit possible bits (bps/Hz) according to each transmit antenna.

The base station receives CQI data for each antenna from the terminals (S20), and selects from the corresponding CQI, the MCS (Modulation Code Set) that can be sent to each terminal (S21). Then, the base station selects one antenna and then selects a plurality of terminals that have a large transmit possible bit number, whereby the total number of selected terminals equal the number of channelization codes (S22, S23). After the terminals are selected, the base station sequentially allocates channelization codes to the selected terminals (S24).

FIG. 6 depicts an example of allocating channelization codes when there are four transmit antennas, eight users, and four channelization codes.

As shown in FIG. 6, the 'transmit possible bit number', i.e., the number of bits that can be transmitted to the terminals UE1, UE6, UE7, and UE8 via the transmit antenna (Tx1) is 4 bps/Hz, the number of bits that can be transmitted to terminal UE3 is 2 bps/Hz, and the number of bits that can be transmitted to terminal UE5 is 0 bps/Hz.

Accordingly, if the transmit antenna Tx1 is first selected, the base station will select the terminals that have a large 'transmit possible bit number' (i.e., UE1, UE6, UE7, and UE8 are selected), and channelization codes (C1~C4) will be sequentially allocated to the symbols that are to be transmitted to the selected terminals (UE1, UE6, UE7, and UE8). Due to this, when a plurality of channelization codes are used in transmitting symbols to multiple terminals (users), the terminals can share the channelization codes, and those terminals that share the same channelization code receive the symbols transmitted via respectively different antennas.

Then, the base station checks whether code allocation for the corresponding transmit antenna (Tx1) has been completed (S25), repeatedly performs the steps after S23 if code allocation is not complete, and checks to see if there are any other remaining antennas if code allocation is completed for the corresponding antenna (S26).

If remaining antennas exist as a result of the checking step, the steps after S22 are repeatedly performed with respect to transmit antennas Tx2 through Tx4, and if no remaining antennas exist as a result of the checking step, the base station multiplexes and transmits the symbols of the terminals that have been allocated the channelization codes through each transmit antenna (Tx1~Tx4) (S27).

Accordingly, as shown in FIG. 6, if the channelization code allocation method of the present invention is employed, a greater number of terminals can use the limited number of channelization codes, because multiple terminals can share a channelization code according to each transmit antenna, unlike the related art method of using one particular channelization code for one particular terminal. In particular, the present invention allows channelization codes to be shared by users according to transmit antennas, to thus increase the throughput of the data that can be transmitted by using each channelization code. Namely, channelization code C1 can be used to transmit a data stream of 48 bps/Hz in the related art, but the present invention allows the same channelization code C1 to be used for transmitting a data stream of 58 bps/Hz.

According to the present invention, the data transmission method in a MIMO (Multiple-input Multiple-Output) system allows allocation of the same channelization code to more than one terminal, if the total number of channelization codes is less than the total number of terminals that receive a particular service.

When channelization codes are shared by multiple terminals, it is necessary to distinguish among the terminals. To do so, channelization code sharing is permitted only if the relative related values of the weight vectors that are multiplied to the data streams of the terminals are smaller than a particular threshold value. Thus, with respect to each terminal, a certain level of interference (caused by the effects of code sharing) from other terminals is permitted so that data streams among multiple terminals can be distinguished.

The MSB (Multi-Stream Beam-forming) MIMO system of the present invention assumes that there are M transmit antennas, each data stream that employs the same channelization code (such as in PARC MSB) are separately coded, and CRC (cyclic redundancy check) codes are added thereto, respectively.

Figure 7:
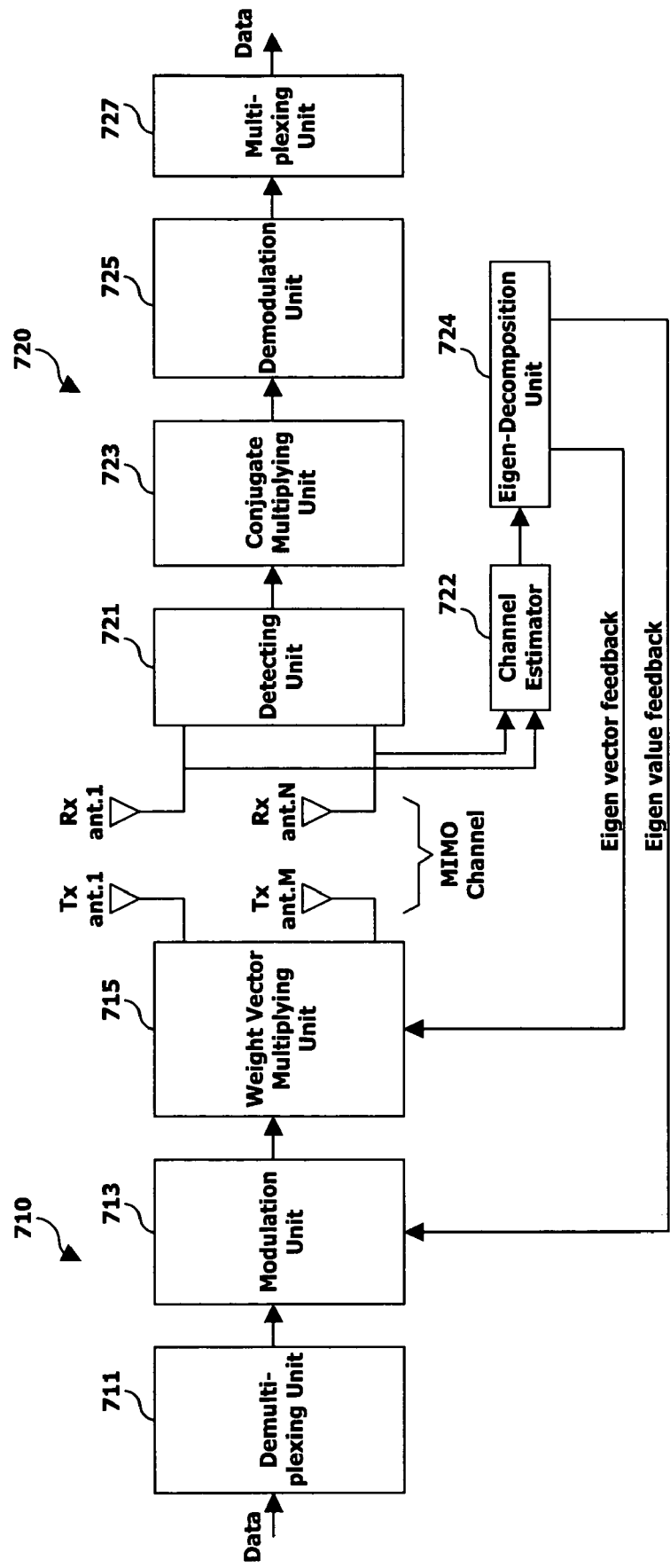
FIG. 7 depicts a blocks diagram of a MIMO system according to the related art.
Figure 9:
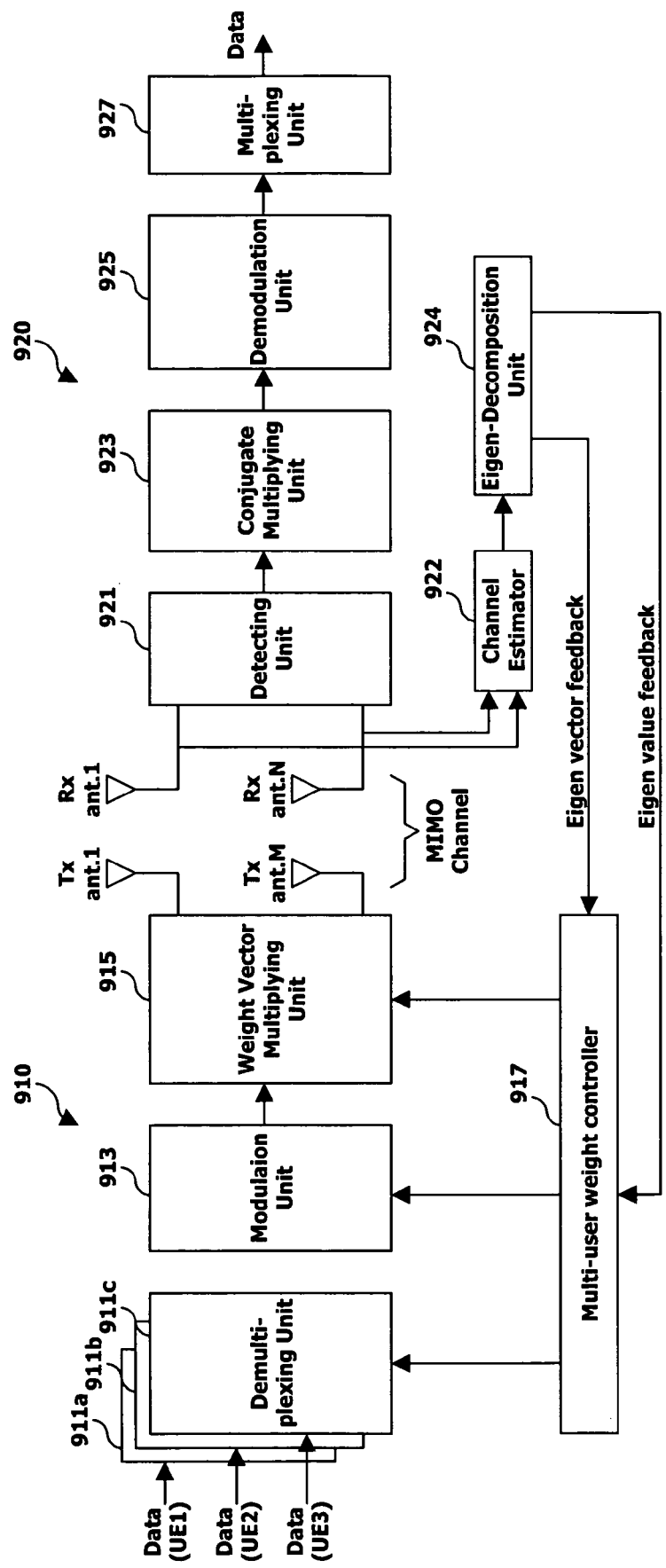
FIG. 9 depicts a block diagram of a MIMO system according to an embodiment of the present invention.

FIG. 9 shows an exemplary structure of a closed-loop MSB MIMO system according to the present invention. It can be understood that the structure according to the present invention is similar to that of the related art FIG. 7, but a control block (e.g., a multi-user weight controller 917) that considers multiple user terminals and provides the appropriate signal processing is additionally employed. Namely, the multi-user weight controller 917 receives feedback from the Eigen-decomposition unit 924 that outputs both eigenvector feedback and eigenvalue feedback. The multi-user weight controller 917 processes this feedback information and provides outputs to the multiple demultiplexing units (911a~911c), the modulation unit 913, and the weight vector multiplying unit 915, for performing the allocation method of the present invention described in more detail below.

FIG. 10 depicts a table used to explain an allocation method for radio resources when the number of channelization codes is less than the number of terminals and multiple terminals simultaneously receive a service in the MIMO system according to an embodiment of the present invention.

As an example, there are 8 terminals (i.e., user equipment: UEs) and 4 channelization codes, which are shared among the terminals whereby only terminals 1, 3, 7, and 8 are allocated with channelization codes and can communicate, while terminals 2, 4, 5, and 6 are not allocated with channelization codes (even though there are available radio resources) and thus cannot communicate.

Here, it can be understood that the data streams for the terminals having channelization codes C1, C2, C3, C4 can be clearly distinguished. Namely, the data streams 1, 2, and 3 of UE 1; the data stream 1 of UE 2; the data streams 1, 2, and 3 of UE 3; and the data streams 1 and 2 of UE 6 all use respectively different channelization codes, thus can be distinguished without interference. However, for example, the data streams 1, 2, and 3 of UE 1 and data stream 1 of UE 4 use the same channelization code, thus a way of distinguishing these is required.

Due to the characteristics of the MSB (Multi-Stream Beam-forming) technique, the same data streams of a terminal, i.e., data streams 1, 2, and 3 can be distinguished by the eigenvector attributes having respectively orthogonal characteristics.

The eigenvector used for data stream 1 of UE 4 does not have orthogonal characteristics with the eigenvectors used for data streams 1, 2, and 3 of UE 1. Thus, in order to share channelization codes among different terminals (such as UE 1 and UE 4), the related value between the eigenvectors multiplied to the data symbols to be transmitted by channelization coding, must be below a particular threshold value. This can be expressed by the following Equation (7):

$$S = W_1^1 s_1^1 + w_2^1 s_2^1 + w_3^1 s_3^1 + w_1^4 s_1^4 \quad (7)$$

Here, $w_i^k$ refers to the eigenvector multiplied to the $i^{th}$ stream of the $k^{th}$ terminal, $s_i^k$ refers to a symbol generated from the independent bit stream outputted from the $i^{th}$ independent coding block of the $k^{th}$ terminal, S refers to the signal vector after beam-forming is performed on each symbol. Namely, because there are no orthogonal characteristics between the weight vector set $w_1^1$, $\{w_2^1, w_3^1\}$ of UE 1 and the weight vector set $\{w_1^4\}$ of UE 4, channelization code sharing is allowed only when the related value ($r_{i,1}^{1,4}=w_i^1 \cdot w_1^4$ (i=1,2, 3)) among the elements of these two sets is below a particular threshold value. When the above technique is expressed in a more general manner, the conditions for the weight value set of multiple terminals that allows channelization code sharing can be expressed as the following Equation (8):

$$\{w_i^k | w_i^k \cdot w_j^l < C_{th}, k=1, \ldots, K, l=1, \ldots, K, i=1, \ldots, M_k, j=1, \ldots, M_l\} \quad (8)$$

Here, k and i refer to the terminal number, subscripts i, j refer to the index of the eigenvector for each terminal.

It is well known that employing multiple antennas at the transmitting end and the receiving end results in an increase of data transmission rate and improvement of communication quality. For a MIMO system providing services to many terminals (users) and if the number of channelization codes are limited, the present invention provides channelization code sharing per transmit antenna among multiple terminals, such that the throughput of data that can be sent by using each channelization code is increased.

Thus, the present invention provides a transmission method for a multiple antenna communication system, the method comprising the steps of receiving channel information from terminals, allocating channelization codes for each transmit antenna based upon the received channel information, and transmitting data via each transmit antenna according to the allocated channelization codes.

Also, as this method can be implemented in the transmitting end of a communication system, the present invention provides a base station apparatus having multiple transmit antennas, comprising, a receiver that receives channel information from terminals, an allocating unit that allocates channelization codes for each transmit antenna based upon the received channel information, and a transmitter that transmits data via each transmit antenna according to the allocated channelization codes.

As described above, the present invention sequentially allocates channelization codes to each transmit antenna according to the channel quality (i.e., the maximum number of bits that can be transmitted) for each antenna by utilizing the fact that the channel quality for each transmit antenna is different. Namely, the base station allocates channelization codes sequentially to users having a good quality channel state with respect to each antenna based upon the CQI (channel quality information) transmitted from the terminals. As a result of allocating channelization codes in this manner, a channelization code can be shared among multiple users, and each of these users can receive data transmitted via different antennas.

Accordingly, the present invention can allow transmission of symbols by using the most optimal channel, thus resulting in a more efficient use of channel resources compared to the related art in which one channelization code was limited to use for only one user. In particular, the present invention allows the sharing of channelization codes among multiple users according to transmit antennas, resulting in a higher throughput of data that can be transmitted trough the use of each channelization code.

Additionally, the present invention has been described with reference to the included drawings only for exemplary purposes. Those skilled in the art would understand that various modifications and equivalent other embodiments of the present invention are possible. Thus, the technical spirit the following claims defines the scope of technical protection for the present invention.

What is claimed is:

1. A transmission method for a multiple antenna communication system, the method comprising:

receiving channel information from terminals;

allocating channelization codes for each transmit antenna based upon the received channel information, the allocating of the channelization codes being performed sequentially to multiple terminals according to a number of bits that can be transmitted, wherein the allocating results in a single channelization code being shared by at least two of the multiple terminals, wherein allocating a same channelization code to multiple terminals based upon channel states when a number of channelization codes used to distinguish terminals is less than a number of terminals receiving a service, and wherein the same channelization code is allocated only when a related value of a set of weight values for those terminals that share said channelization code is below a particular threshold value; and transmitting data via each transmit antenna according to the allocated channelization codes, wherein the receiving, the allocating, and the transmitting are performed in a closed-loop Multiple-Input Multiple-Output (MIMO) communication system.

2. The method of claim 1, wherein the channel information relates to the number of bits that can be transmitted via each antenna for each terminal.

3. The method of claim 1, wherein the channel information relates to a quality, a condition, or a state of the channel to be used for data transmission.

4. The method of claim 1, wherein the sequential allocation is performed by first allocating channelization codes to those terminals that can transmit a greatest number of bits, and then to those terminals that can transmit a next greatest number of bits.

5. The method of claim 1, wherein the MIMO system employs a Multi-Stream Beam-forming (MSB) technique.

6. A base station apparatus having multiple transmit antennas, the apparatus comprising:

a receiver that receives channel information from terminals;

an allocating unit that allocates channelization codes for each transmit antenna based upon the received channel information, the channel information relating to a number of bits that can be transmitted via each antenna for each of the terminals, and the allocating unit allocates at least one channelization code to be shared by at least two terminals, wherein the allocating unit allocates a same channelization code to multiple terminals based upon channel states when a number of channelization codes used to distinguish terminals is less than a number of terminals receiving a service, and wherein the allocating unit allocates the same channelization code only when a related value of a set of weight values for those terminals that share said channelization code is below a particular threshold value; and a transmitter that transmits data via each transmit antenna according to the allocated channelization codes, wherein the receiver, the allocating unit and the transmitter are in a closed-loop Multiple-Input Multiple-Output (MIMO) communication system.

7. The apparatus of claim 6, wherein the channel information relates to a quality, a condition, or a state of the channel to be used for data transmission.

8. The apparatus of claim 6, wherein the allocating unit allocates the channelization codes sequentially to multiple terminals according to the number of bits that can be transmitted.

9. The apparatus of claim 8, wherein the allocation unit sequentially allocates the channelization codes by first allocating channelizanon codes to those terminals that can transmit a greatest number of bits, and then to those terminals that can transmit a next greatest number of bits.

10. The apparatus of claim 6, wherein the MIMO system employs a Multi-Stream Beam-forming (MSB) or Per Antenna Rate Control (PSRC) technique.

11. A transmission method comprising:
receiving channel information from a plurality of terminals;
allocating channelization codes for each of a plurality of transmitting antennas of a closed-loop Multiple-Input Multiple-Output (MIMO) communication system, the allocating being based upon the received channel information, the allocating resulting in at least one channelization code being allocated to two separate ones of the transmitting antennas, wherein allocating the at least one channelization code to two separate ones of the transmitting antennas based upon channel states when a number of channelization codes used to distinguish terminals is less than a number of terminals receiving a service, and wherein the at least one channelization code is allocated only when a related value of a set of weight values for those terminals that share said channelization code is below a particular threshold value; and
transmitting data via each of the plurality of transmitting antennas according to the allocated channelization codes.

12. The method of claim 11, wherein the channel information corresponds to a number of bits that can be transmitted to each terminal.

13. The method of claim 12, wherein allocating the channelization codes is performed sequentially to the plurality of transmitting terminals according to a number of bits that can be transmitted to each terminal.

14. The method of claim 13, wherein the allocating includes allocating channelization codes to terminals that can transmit a greatest number of bits, and then to those terminals that can transmit a next greatest number of bits.

15. The method of claim 11, wherein the channel information corresponds to a quality, a condition, or a state of a channel to be used for data transmission.

* * * * *